United States Patent
Nakahara et al.

(10) Patent No.: US 9,865,872 B2
(45) Date of Patent: Jan. 9, 2018

(54) LITHIUM-ION BATTERY AND METHOD FOR PRODUCING SAME

(71) Applicants: Kentaro Nakahara, Tokyo (JP); Sadanori Hattori, Tokyo (JP)

(72) Inventors: Kentaro Nakahara, Tokyo (JP); Sadanori Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 14/376,872

(22) PCT Filed: Feb. 1, 2013

(86) PCT No.: PCT/JP2013/052417
§ 371 (c)(1),
(2) Date: Aug. 6, 2014

(87) PCT Pub. No.: WO2013/118661
PCT Pub. Date: Aug. 15, 2013

(65) Prior Publication Data
US 2015/0194671 A1 Jul. 9, 2015

(30) Foreign Application Priority Data
Feb. 6, 2012 (JP) .................................. 2012-023540

(51) Int. Cl.
*H01M 4/485* (2010.01)
*H01M 4/583* (2010.01)
(Continued)

(52) U.S. Cl.
CPC ......... *H01M 4/505* (2013.01); *H01M 4/0438* (2013.01); *H01M 4/525* (2013.01);
(Continued)

(58) Field of Classification Search
None
See application file for complete search history.

(56) References Cited

U.S. PATENT DOCUMENTS

| 6,399,041 B1 | 6/2002 | Ado et al. |
| 2005/0142442 A1* | 6/2005 | Yuasa ............... H01M 2/023 429/220 |

(Continued)

FOREIGN PATENT DOCUMENTS

| JP | 6-290776 | 10/1994 |
| JP | 11-263624 | 9/1999 |

(Continued)

OTHER PUBLICATIONS

International Search Report dated Apr. 23, 2013.

*Primary Examiner* — Rena D Cronin
(74) *Attorney, Agent, or Firm* — Finnegan, Henderson, Farabow, Garrett & Dunner, L.L.P.

(57) ABSTRACT

The present invention relates to a lithium-ion battery. The lithium-ion battery comprises a positive electrode containing, as a principal component, a lithium oxide having a layered rock-salt structure and represented by chemical formula: $Li_xM^1{}_yM^2{}_zO_{2-d}$. In this chemical formula, $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof. The lithium-ion battery also comprises a negative electrode containing, as a principal component, a material capable of intercalating/deintercalating lithium ions, wherein peroxide ion(s) ($O_2{}^{2-}$) are contained in the positive electrode.

8 Claims, 1 Drawing Sheet

(51) Int. Cl.
*H01M 4/525* (2010.01)
*H01M 4/505* (2010.01)
*H01M 10/44* (2006.01)
*H01M 10/058* (2010.01)
*H01M 4/04* (2006.01)
*H01M 10/0525* (2010.01)
*H01M 10/04* (2006.01)
*H01M 4/02* (2006.01)

(52) U.S. Cl.
CPC ......... *H01M 10/04* (2013.01); *H01M 10/058* (2013.01); *H01M 10/0525* (2013.01); *H01M 2004/028* (2013.01); *Y02T 10/7011* (2013.01); *Y10T 29/49108* (2015.01)

(56) References Cited

U.S. PATENT DOCUMENTS

| | | | | |
|---|---|---|---|---|
| 2007/0026311 A1* | 2/2007 | Obana | ............... | H01M 4/525 429/217 |
| 2007/0141469 A1* | 6/2007 | Tokunaga | ............. | H01M 4/131 429/231.3 |
| 2007/0218359 A1* | 9/2007 | Shimizu | ................ | H01M 4/505 429/223 |
| 2011/0212366 A1* | 9/2011 | Shimizu | ................ | H01M 4/505 429/223 |
| 2011/0212367 A1* | 9/2011 | Shimizu | ................ | H01M 4/505 429/223 |
| 2011/0256442 A1* | 10/2011 | Kageira | ............... | H01M 4/0404 429/144 |
| 2012/0328948 A1* | 12/2012 | Shimizu | ................ | H01M 4/505 429/223 |
| 2014/0099549 A1* | 4/2014 | Ceder | ................... | H01M 4/485 429/220 |

FOREIGN PATENT DOCUMENTS

| | | | | |
|---|---|---|---|---|
| JP | 2000082466 | * | 3/2000 | |
| JP | 2001-143709 | | 5/2001 | |
| JP | 2002-110224 | | 4/2002 | |
| JP | 2003160337 | * | 6/2003 | |
| JP | 2006-164758 | | 6/2006 | |
| JP | 2007-194202 | * | 8/2007 | ............ H01M 4/505 |
| JP | 2008-270201 | | 11/2008 | |
| JP | 2009-179501 | | 8/2009 | |
| JP | 2010-103086 | | 5/2010 | |
| JP | 2011-009202 | | 1/2011 | |

* cited by examiner

LITHIUM-ION BATTERY AND METHOD FOR PRODUCING SAME

CROSS-REFERENCE TO RELATED PATENT APPLICATIONS

This application is a National Stage Entry of International Application No. PCT/JP2013/052417, filed Feb. 1, 2013, which claims priority from Japanese Patent Application No. 2012-023540, filed Feb. 6, 2012. The entire contents of the above-referenced applications are expressly incorporated herein by reference.

TECHNICAL FIELD

The present invention relates to a lithium-ion battery capable of stably providing a high capacity, and a method for producing the same.

BACKGROUND ART

A lithium-ion battery comprising a positive electrode containing, as a principal component, a lithium oxide having a layered rock-salt structure and represented by chemical formula: $Li_xM^1{}_yM^2{}_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, and a negative electrode containing, as a principal component, a material capable of intercalating/deintercalating lithium ions has been recently expected as a secondary battery having a high energy density. However, this type of lithium-ion battery may have a problem of not stably providing a high capacity.

Patent Literature 1 discloses a technique for improving cycle durability and stably providing a high capacity by an oxidation treatment in which a charge/discharge cycle is repeated within a potential range not exceeding a prescribed potential, for example, a charge/discharge cycle is repeated within a potential range in which the highest potential is not less than 3.9 V and less than 4.6 V relative to the lithium metal counter electrode. In addition, Patent Literature 2 discloses a technique for improving cycle durability and stably providing a high capacity by a charge/discharge pre-treatment (an oxidation treatment) in which a charge/discharge cycle is repeated with a controlled charging capacity (charging electric capacity). Although these oxidation treatments have the effect of allowing the battery to stably provide a high capacity, the effect is still insufficient.

CITATION LIST

Patent Literature

Patent Literature 1: Japanese Patent Laid-Open No. 2008-270201
Patent Literature 2: Japanese Patent Laid-Open No. 2010-103086

SUMMARY OF INVENTION

Technical Problem

As described above, a lithium-ion battery comprising a positive electrode containing, as a principal component, a lithium oxide having a layered rock-salt structure and represented by chemical formula: $Li_xM^1{}_yM^2{}_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, and a negative electrode containing, as a principal component, a material capable of intercalating/deintercalating lithium ions may have a problem of not stably providing a high capacity.

An object of the present invention is to solve the aforementioned problem, and provide a lithium-ion battery comprising a positive electrode containing, as a principal component, a lithium oxide having a layered rock-salt structure and represented by chemical formula: $Li_xM^1{}_yM^2{}_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, and a negative electrode containing, as a principal component, a material capable of intercalating/deintercalating lithium ions, which is capable of stably providing a high capacity, and a method for producing the same.

Solution to Problem

The present invention relates to a lithium-ion battery comprising
a positive electrode containing, as a principal component, a lithium oxide having a layered rock-salt structure and represented by chemical formula: $Li_xM^1{}_yM^2{}_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof; and
a negative electrode containing, as a principal component, a material capable of intercalating/deintercalating lithium ions,
wherein peroxide ion(s) ($O_2{}^{2-}$) are contained in the positive electrode.

In addition, the present invention relates to a method for producing the lithium-ion battery, comprising a step of:
generating peroxide ion(s) ($O_2{}^{2-}$) in the positive electrode by an oxidation treatment in which a charge/discharge is performed at a temperature of 10° C. or less, and then a charge/discharge is performed at an elevated temperature.

Moreover, the present invention relates to a method for subjecting a lithium-ion battery to oxidation treatment, comprising
performing a charge/discharge at a temperature of 10° C. or less, and then performing a charge/discharge at an elevated temperature.

Advantageous Effects of Invention

The present invention may provide a lithium-ion battery comprising a positive electrode containing, as a principal component, a lithium oxide having a layered rock-salt structure and represented by chemical formula: $Li_xM^1{}_yM^2{}_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, and a negative electrode containing, as a principal component, a material capable of intercalating/deintercalating lithium ions, which is capable of stably providing a high capacity; and a method for producing the same.

DESCRIPTION OF EMBODIMENTS

Figure 1:
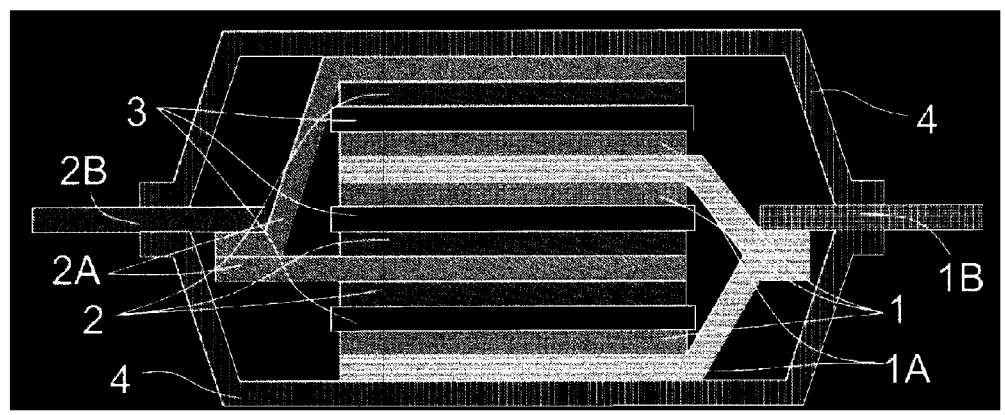
FIG. 1 is a cross-sectional view illustrating a structure of one example of a lithium-ion battery according to the present invention.

The lithium-ion battery of the present invention comprises a positive electrode containing, as a principal component, a lithium oxide having a layered rock-salt structure and represented by chemical formula: $Li_xM^1_yM^2_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, and a negative electrode containing, as a principal component, a material capable of intercalating/deintercalating lithium ions. Moreover, peroxide ion(s) are contained in the positive electrode. A lithium-ion battery wherein peroxide ion(s) are contained in the positive electrode may provide a higher capacity more stably than a battery wherein no peroxide ion(s) are contained therein.

In one embodiment of the present invention, for example, charge/discharge is performed at a low temperature of 10° C. or less, and then charge/discharge is performed at an elevated temperature preferably with an upper limit to the voltage of the positive electrode during charge fixed at 4.6 V or more relative to lithium metal, to generate peroxide ion(s) in the positive electrode. By this process, the lithium oxide as the principal component of the positive electrode may be activated while suppressing the structural degradation of the material, and hence, a lithium-ion battery having high stability may be provided. A method of oxidation treatment to generate peroxide ion(s) in the positive electrode is not particularly limited.

It may be confirmed that peroxide ion(s) are contained in the positive electrode, for example, by observing a peak at 737 cm$^{-1}$ in the Raman spectrum of the positive electrode, which is derived from stretching mode of peroxide ion. It is determined that no peroxide ion(s) are contained in the positive electrode when a clear peak is not observed at 737 cm$^{-1}$. The presence of peroxide ion(s) in the positive electrode may be also confirmed by X-ray photoelectron spectroscopy. In the X-ray photoelectron spectroscopy, a peak derived from peroxide ion is observed in the vicinity of 532 eV of bond energy in the oxygen is spectrum.

Next, a preferable embodiment of the present invention will be described with reference to the accompanying drawing. It is noted that the following embodiment is described merely as an example, and that the present invention is not limited to this embodiment. The lithium-ion battery of the present invention is characterized in that the positive electrode contains, as a principal component, a lithium oxide having a layered rock-salt structure and represented by chemical formula: $Li_xM^1_yM^2_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, and peroxide ion(s) ($O_2^{2-}$) are contained in the positive electrode. Accordingly, the other elements of the battery, such as materials for the positive electrode except for the above-described material, materials for the negative electrode, and materials for a separator and an electrolyte are not particularly limited, and the structure of the battery, including a laminated type and a winding type, is also not particularly limited.

FIG. 1 is a cross-sectional view of a lithium-ion battery having a laminated structure, which is one embodiment of the lithium-ion battery of the present invention. This lithium-ion battery having a laminated structure comprises a positive electrode 1 containing, as a principal component, a lithium oxide having a layered rock-salt structure and represented by chemical formula: $Li_xM^1_yM^2_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, a positive electrode collector 1A, a negative electrode 2 containing, as a principal component, a material capable of intercalating/deintercalating lithium ions, a negative electrode collector 2A, a porous film separator 3 containing an electrolyte, an outer package 4, and a positive electrode lead tab 1B and a negative electrode lead tab 2B for taking out electricity.

Although the lithium-ion battery wherein the electricity generating element is a laminated type, the outer shape is rectangular, and the outer package is a laminated film is illustrated in FIG. 1, the shape of the battery is not particularly limited, and any of known shapes may be employed.

Examples of the electricity generating element include, in addition to the laminated type, a winding type and a folding type, but the laminated type is preferably employed because it is excellent in heat dissipation. Examples of the outer shape of the lithium-ion battery include, in addition to the rectangular shape, a cylindrical shape, a coin shape and a sheet shape.

An aluminum laminated film may be suitably used as the outer package 4, for example, but the outer package is not particularly limited, and any of known materials may be used to construct the lithium-ion battery. The shape of the outer package 4 is not also particularly limited, and a metal case, a resin case, or the like, in addition to the film, for example, may be used to seal the battery. Examples of the material for the outer package 4 to be used include a metallic material such as iron and aluminum, a plastic material, a glass material, and a composite material obtained by laminating any of these materials. The outer package is, however, preferably an aluminum laminated film in which aluminum is laminated on a film of polymer such as nylon and polypropylene because a degassing operation may be easily performed after the oxidation treatment.

The positive electrode 1 of the lithium-ion battery of the present invention contains, as a principal component, the lithium oxide having a layered rock-salt structure and represented by chemical formula: $Li_xM^1_yM^2_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof.

The composition of the lithium oxide is not particularly limited. However, $M^1$ is preferably Mn because a high capacity may be provided, and $M^1$ is more preferably a mixture of Mn and Ti in view of improving the stability. Meanwhile, $M^2$ is preferably Fe in view of low cost, and $M^2$ is more preferably a mixture of Fe and Ni in view of improving the stability.

Specific examples of the composition of the lithium oxide include $Li_{1.19}Mn_{0.52}Fe_{0.22}O_{2.00}$, $Li_{1.20}Mn_{0.40}Fe_{0.40}O_{2.00}$, $Li_{1.23}Mn_{0.46}Fe_{0.31}O_{2.00}$, $Li_{1.29}Mn_{0.57}Fe_{0.14}O_{2.00}$, $Li_{1.20}Mn_{0.40}Ni_{0.40}O_{2.00}$, $Li_{1.23}Mn_{0.46}Ni_{0.31}O_{2.00}$, $Li_{1.26}Mn_{0.52}Ni_{0.22}O_{2.00}$, $Li_{1.29}Mn_{0.57}Ni_{0.14}O_{2.00}$, $Li_{1.20}Mn_{0.60}Ni_{0.20}O_{2.00}$, $Li_{1.23}Mn_{0.61}Ni_{0.15}O_{2.00}$, $Li_{1.26}Mn_{0.63}Ni_{0.11}O_{2.00}$, $Li_{1.29}Mn_{0.64}Ni_{0.07}O_{2.00}$, $Li_{1.20}Mn_{0.40}Fe_{0.20}Ni_{0.20}O_{2.00}$, $Li_{1.23}Mn_{0.46}Fe_{0.15}Ni_{0.15}O_{2.00}$, $Li_{1.26}Mn_{0.52}Fe_{0.11}Ni_{0.11}O_{2.00}$, $Li_{1.29}Mn_{0.57}Fe_{0.07}Ni_{0.14}O_{2.00}$, $Li_{1.26}Mn_{0.37}Ti_{0.15}Ni_{0.22}O_{2.00}$, $Li_{1.26}Mn_{0.37}Ti_{0.15}Fe_{0.22}O_{2.00}$, $Li_{1.23}Mn_{0.33}Ti_{0.13}Fe_{0.15}Ni_{0.15}O_{2.00}$, $Li_{1.20}Mn_{0.56}Ni_{0.17}Co_{0.07}O_{2.00}$, and $Li_{1.20}Mn_{0.54}Ni_{0.13}Co_{0.13\ 2.00}$.

At the stage of assembling the lithium-ion battery, the oxygen deficiency (d) of the lithium oxide is generally substantially 0 (zero), but in some cases, the oxygen deficiency (d) may be shifted by approximately ±0.05 depending on the synthesis method and the composition of the positive electrode. In some cases, Li may be also shifted from the stoichiometric composition depending on the synthesis method and the composition of the positive electrode.

Furthermore, in view of providing a high capacity, the lithium oxide used in the present invention preferably has a broad peak in a range of 20° to 24° in the measurement of X-ray powder diffraction.

The positive electrode 1 of the lithium-ion battery of the present invention generally contains such a lithium oxide and a binder, and further contains a conductivity-imparting agent, if necessary.

As the binder for the positive electrode, any of known binders may be used. Examples thereof include polyvinylidene fluoride, polytetrafluoroethylene (PTFE), vinylidene fluoride-hexafluoropropylene copolymer, styrene-butadiene copolymer rubber, polypropylene, polyethylene and polyacrylonitrile.

As the conductivity-imparting agent for the positive electrode, any of known conductivity-imparting agents may be used. Examples thereof include carbon black, ketjen black, vapor-grown carbon fiber, furnace black, carbon nanotube, graphite, non-graphitizing carbon, and a metal powder.

The content of the lithium oxide in the positive electrode 1 may be arbitrarily adjusted. A sufficient capacity may be generally provided when the content of the lithium oxide is 50% by weight or more based on the total weight of the positive electrode, and if a larger capacity is desired, the content is preferably 70% by weight or more, and particularly preferably 85% by weight or more.

The thickness of the positive electrode may be arbitrarily adjusted. A sufficient capacity may be generally provided when the thickness of the positive electrode is 20 μm or more, and if a larger capacity is desired, the thickness is preferably 50 μm or more, and particularly preferably 70 μm or more.

As the positive electrode collector 1A, any of known positive electrode collectors may be used, and for example, a perforated aluminum foil may be suitably used. Examples of the material for the positive electrode collector 1A include aluminum, aluminum alloy and stainless steel. As the shape of the positive electrode collector 1A, a foil, a flat plate or a mesh may be employed. The positive electrode collector 1A is particularly preferably one having a hole penetrating from the front surface to the rear surface to improve permeability of a gas formed in the battery along the battery thickness direction, and an expanded metal, a punching metal, a metal net, a foam, or a porous foil provided with holes by etching, or the like, for example, may be preferably used.

The negative electrode 2 of the lithium-ion battery of the present invention contains, as a principal component, a material capable of intercalating/deintercalating lithium ions, and generally contains a material capable of intercalating/deintercalating lithium ions and a binder, and further contains a conductivity-imparting agent, if necessary.

The material capable of intercalating/deintercalating lithium ions, which is contained in the negative electrode 2, is not particularly limited in particle size and material. Examples of the material include graphite/carbon materials such as artificial graphite, natural graphite, hard carbon and active carbon, conductive polymers such as polyacene, polyacetylene, polyphenylene, polyaniline and polypyrrole, alloy materials such as silicon, tin and aluminum, which form an alloy with lithium metal, lithium oxides such as lithium titanate, and lithium metal. Such a carbon material or an alloy material to form an alloy with lithium metal may be doped with lithium ions beforehand.

As the binder for the negative electrode, any of known binders may be used. Examples thereof include polyvinylidene fluoride, polytetrafluoroethylene (PTFE), polyvinylidene fluoride-hexafluoropropylene copolymer, styrene-butadiene copolymer rubber, polypropylene, polyethylene, and polyacrylonitrile.

As the conductivity-imparting agent for the negative electrode, any of known conductivity-imparting agents may be used. Examples thereof include carbon black, ketjen black, acetylene black, furnace black, carbon nanotube, and a metal powder.

The content of the material capable of intercalating/deintercalating lithium ions in the negative electrode 2 may be arbitrarily adjusted. A sufficient capacity may be generally provided when the content of the material capable of intercalating/deintercalating lithium ions is 70% by weight or more based on the total weight of the negative electrode, and if a larger capacity is desired, the content is preferably 80% by weight or more, and particularly preferably 90% by weight or more.

The thickness of the negative electrode may be arbitrarily adjusted. A sufficient capacity may be generally provided when the thickness of the negative electrode is 30 μm or more, and if a larger capacity is desired, the thickness is preferably 50 μm or more, and particularly preferably 70 μm or more.

As the negative electrode collector 2A, any of known negative electrode collectors may be used, and for example, a perforated copper foil may be suitably used. Examples of the material for the negative electrode collector 2A include copper, nickel and stainless steel. As the shape of the negative electrode collector 2A, a foil, a flat plate or a mesh may be employed. The negative electrode collector 2A is particularly preferably one having a hole penetrating from the front surface to the rear surface to improve permeability of a gas formed in the battery along the battery thickness direction, and an expanded metal, a punching metal, a metal net, a foam or a porous foil provided with holes by etching, or the like, for example, may be preferably used.

The lithium-ion battery of the present invention generally comprises an electrolyte between the positive electrode 1 and the negative electrode 2. The lithium-ion battery illustrated in FIG. 1 comprises the porous film separator 3 containing an electrolyte solution as the electrolyte.

The electrolyte serves for charge carrier transportation between the positive electrode 1 and the negative electrode 2, and one having an electrolyte ion conductivity of $10^{-5}$ to $10^{-1}$ S/cm at room temperature, in general, may be suitably used.

As the electrolyte, any of known electrolytes may be used, and for example, an electrolyte solution obtained by dissolving an electrolyte salt (supporting salt) in a solvent may be used.

Examples of the supporting salt include lithium salts such as $LiPF_6$, $LiBF_4$, $LiClO_4$, $LiCF_3SO_3$, $LiN(CF_3SO_2)_2$, $LiN(C_2F_5SO_2)_2$, $LiC(CF_3SO_2)_3$ and $LiC(C_2F_5SO_2)_3$.

Examples of the solvent used in the electrolyte solution include organic solvents such as ethylene carbonate (EC), propylene carbonate (PC), dimethyl carbonate (DMC), diethyl carbonate, methyl ethyl carbonate, γ-butyrolactone, tetrahydrofuran, dioxolane, sulfolane, dimethylformamide, dimethylacetamide and N-methyl-2-pyrolidone, and a sulfuric acid aqueous solution and water. One of these solvents may be singly used, or a mixture of two or more of these solvents may be used.

The concentration of the electrolyte salt is not particularly limited, and may be, for example, 1 M.

Alternatively, in the present invention, a solid electrolyte may be used as the electrolyte. Examples of the material for the organic solid electrolyte include vinylidene fluoride polymers such as polyvinylidene fluoride and vinylidene fluoride-hexafluoropropylene copolymer, acrylonitrile polymers such as acrylonitrile-methyl methacrylate copolymer and acrylonitrile-methyl acrylate copolymer, and polyethylene oxide. The polymer material may be impregnated with an electrolyte solution to form a gel and the gel may be used, or alternatively, the polymer material itself may be used directly. Meanwhile, examples of the inorganic solid electrolyte include $CaF_2$, AgI, LiF, β-alumina and a lithium-containing glass material.

The separator 3 is placed between the positive electrode and the negative electrode, and has the function of conducting ions alone, and not conducting electrons. As the separator 3, any of known separators such as a polyolefin porous film may be used. Examples thereof include porous films of polyolefin such as polypropylene and polyethylene, and fluororesin, and the like.

In one embodiment, at the stage of assembling the lithium-ion battery, an active material contained in the positive electrode 1 contains, as a principal component, a lithium-iron-manganese composite oxide having a layered rock-salt structure and represented by chemical formula: $Li_{1.19}Mn_{0.52}Fe_{0.22}O_{1.98}$, and the positive electrode 1 consists of 85% by weight of the lithium-iron-manganese composite oxide, 6% by weight of ketjen black, 3% by weight of vapor-grown carbon fiber, and 6% by weight of polyvinylidene fluoride. The positive electrode 1 has a thickness of 35 μm. In addition, a perforated aluminum foil is used as the positive electrode collector 1A.

In one embodiment, an active material contained in the negative electrode 2 is artificial graphite having an average particle size of 15 μm, and the negative electrode 2 consists of 90% by weight of the artificial graphite, 1% by weight of ketjen black, and 9% by weight of polyvinylidene fluoride. The negative electrode 2 has a thickness of 48 μm. In addition, a perforated copper foil is used as the negative electrode collector 2A.

In one embodiment, the positive electrode lead tab 1B for taking out electricity may be an aluminum plate, and the negative electrode lead tab 2B may be a nickel plate.

In one embodiment, the separator 3 is a polyolefin porous film containing an electrolyte solution of a mixed solvent of ethylene carbonate (EC) and dimethyl carbonate (DMC) (mixed volume ratio of EC/DMC=4/6) containing 1.0 M of lithium hexafluorophosphate ($LiPF_6$) as an electrolyte.

In one embodiment, the outer package 4 is an aluminum laminated film, and more specifically, a laminated material wherein an aluminum foil is placed between an oriented nylon and a polypropylene resin.

In one embodiment of the present invention, the materials as described above are used to assemble the lithium-ion battery by a known method, and then an oxidation treatment is performed to generate peroxide ion(s) ($O_2^{2-}$) in the positive electrode.

A method of oxidation treatment to generate peroxide ion(s) in the positive electrode after the oxidation treatment is not particularly limited, but may be preferably an oxidation treatment process in which charge/discharge is performed at a low temperature of 10° C. or less, and then charge/discharge is performed at an elevated temperature, because peroxide ion(s) may be easily generated. In addition, the upper limit to the voltage of the positive electrode during charge is preferably fixed. In this case, the upper limit to the voltage of the positive electrode is preferably fixed at 4.6 V or more, more preferably 4.7 V or more, relative to lithium metal, because the oxidation treatment may be sufficiently completed.

In the oxidation treatment of the present invention, peroxide ion(s) ($O_2^{2-}$) may be generated in the positive electrode by, for example, performing charge/discharge at a temperature of −30 to 10° C. in the first charge/discharge cycle, and then performing charge/discharge 2 times to 50 times while increasing the temperature in a stepwise manner, and performing the charge/discharge at a temperature of 10 to 60° C. in the final charge/discharge cycle, under the condition that the upper limit to the voltage of the positive electrode during charge is fixed at 4.6 V or more relative to lithium metal.

In one embodiment, the prepared lithium-ion battery (before an oxidation treatment) is subjected to an oxidation treatment by repeating a cycle, in which the battery is charged to 4.8 V at a constant current of 20 mA/g, and then charged at a constant voltage of 4.8 V until the current is lowered to 5 mA/g, and then the battery is discharged to 2.0 V at a current of 20 mA/g, twice at a temperature of 0° C.;

repeating the cycle twice at a temperature of 10° C.;

repeating the cycle twice at a temperature of 20° C.; and repeating the cycle twice at a temperature of 30° C.

This oxidation treatment process may be used to provide a lithium-ion battery comprising a positive electrode containing, as a principal component, a lithium oxide having a layered rock-salt structure and represented by chemical formula: $Li_xM^1_yM^2_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof, wherein peroxide ion(s) ($O_2^{2-}$) are contained in the positive electrode after the oxidation treatment.

If necessary, the inside of the lithium-ion battery after the oxidation treatment may be degassed by breaking the seal of the battery once and reducing the pressure, and then the battery may be sealed again, to provide the lithium-ion battery of the present invention.

EXAMPLES

The present invention will be described below more specifically with reference to Examples, but the present invention is not limited to these Examples.

Example 1

<Preparation of Positive Electrode>

An ink containing 85% by weight of $Li_{1.19}Mn_{0.52}Fe_{0.22}O_{1.98}$ as a lithium oxide having a layered rock-salt structure, 6% by weight of ketjen black, 3% by weight of vapor-grown carbon fiber and 6% by weight of polyvinylidene fluoride was applied on a positive electrode collector 1A made of a perforated mesh aluminum foil (thickness: 38 μm) and dried, to provide a positive electrode 1 having a thickness of 35 μm. A double-sided electrode having the positive electrodes 1 applied and dried on both surfaces of the positive electrode collector 1A was also prepared in the same manner.

<Preparation of Negative Electrode>

An ink containing 90% by weight of artificial graphite having an average particle size of 15 μm, 1% by weight of ketjen black and 9% by weight of polyvinylidene fluoride was applied on a negative electrode collector 2A made of a perforated mesh copper foil (thickness: 28 μm) and dried, to provide a negative electrode 1 having a thickness of 48 μm. A double-sided electrode having the negative electrodes 2 applied and dried on both surfaces of the negative electrode collector 2A was also prepared in the same manner.

<Preparation of Lithium-Ion Battery>

The positive electrode 1 and the positive electrode collector 1A, and the negative electrode 2 and the negative electrode collector 2A, which were prepared as described above, were shaped, and then stacked with a porous film separator 3 placed therebetween, and a positive electrode tab 1B and a negative electrode tab 2B were welded thereto respectively, to provide an electricity generating element. The electricity generating element was wrapped in an outer package made of an aluminum laminated film, and three sides of the outer package were sealed by thermal fusion bonding, and then the electricity generating element in the outer package was impregnated with an electrolyte solution of an EC/DMC mixed solvent (mixed volume ratio: EC/DMC=4/6) containing 1.0 M of $LiPF_6$ as an electrolyte at an appropriate degree of vacuum. Subsequently, the remaining one side of the outer package was sealed by thermal fusion bonding under reduced pressure, to provide a lithium-ion battery before an oxidation treatment.

<Oxidation Treatment Process>

The prepared lithium-ion battery before an oxidation treatment was subjected to an oxidation treatment by repeating a cycle, in which the battery was charged to 4.8 V at a constant current of 20 mA/g, and then charged at a constant voltage of 4.8 V until the current was lowered to 5 mA/g, and then the battery was discharged to 2.0 V at a current of 20 mA/g, twice in a thermostatic chamber at a temperature of 0° C.;

repeating the cycle twice in a thermostatic chamber at a temperature of 10° C.;

repeating the cycle twice in a thermostatic chamber at a temperature of 20° C.; and repeating the cycle twice in a thermostatic chamber at a temperature of 30° C.

Subsequently, the inside of the lithium-ion battery after the oxidation treatment was degassed by breaking the seal of the battery once and reducing the pressure, and then the battery was sealed again, to provide a lithium-ion battery of the present invention.

Example 2

A lithium-ion battery was prepared in the same manner as in Example 1 except that $Li_{1.19}Mn_{0.52}Fe_{0.22}O_{1.98}$ used in Example 1 as the lithium oxide having a layered rock-salt structure was replaced with $Li_{1.21}Mn_{0.46}Fe_{0.15}Ni_{0.15}O_{1.99}$.

Example 3

A lithium-ion battery was prepared in the same manner as in Example 1 except that $Li_{1.19}Mn_{0.52}Fe_{0.22}O_{1.98}$ used in Example 1 as the lithium oxide having a layered rock-salt structure was replaced with $Li_{1.19}Mn_{0.37}Ti_{0.15}Fe_{0.21}O_{1.97}$.

Comparative Example 1

A lithium-ion battery before an oxidation treatment, which was prepared in the same manner as in Example 1, was subjected to an oxidation treatment by repeating a cycle, in which the battery was charged to 4.8 V at a constant current of 20 mA/g, and then charged at a constant voltage of 4.8 V until the current was lowered to 5 mA/g, and then the battery was discharged to 2.0 V at a current of 20 mA/g, 4 times in a thermostatic chamber at a temperature of 30° C. Subsequently, the inside of the lithium-ion battery after the oxidation treatment was degassed by breaking the seal of the battery once and reducing the pressure, and then the battery was sealed again, to provide a lithium-ion battery.

Comparative Example 2

A lithium-ion battery before an oxidation treatment, which was prepared in the same manner as in Example 2, was subjected to an oxidation treatment by repeating a cycle, in which the battery was charged to 4.8 V at a constant current of 20 mA/g, and then charged at a constant voltage of 4.8 V until the current was lowered to 5 mA/g, and then the battery was discharged to 2.0 V at a current of 20 mA/g, 4 times in a thermostatic chamber at a temperature of 30° C.

Subsequently, the inside of the lithium-ion battery after the oxidation treatment was degassed by breaking the seal of the battery once and reducing the pressure, and then the battery was sealed again, to provide a lithium-ion battery.

Comparative Example 3

A lithium-ion battery before an oxidation treatment, which was prepared in the same manner as in Example 3, was subjected to an oxidation treatment by repeating a cycle, in which the battery was charged to 4.8 V at a constant current of 20 mA/g, and then charged at a constant voltage of 4.8 V until the current was lowered to 5 mA/g, and then the battery was discharged to 2.0 V at a current of 20 mA/g, 4 times in a thermostatic chamber at a temperature of 30° C.

Subsequently, the inside of the lithium-ion battery after the oxidation treatment was degassed by breaking the seal of the battery once and reducing the pressure, and then the battery was sealed again, to provide a lithium-ion battery.

<Method for Analyzing and Evaluating Lithium-Ion Battery>

Figure 2:
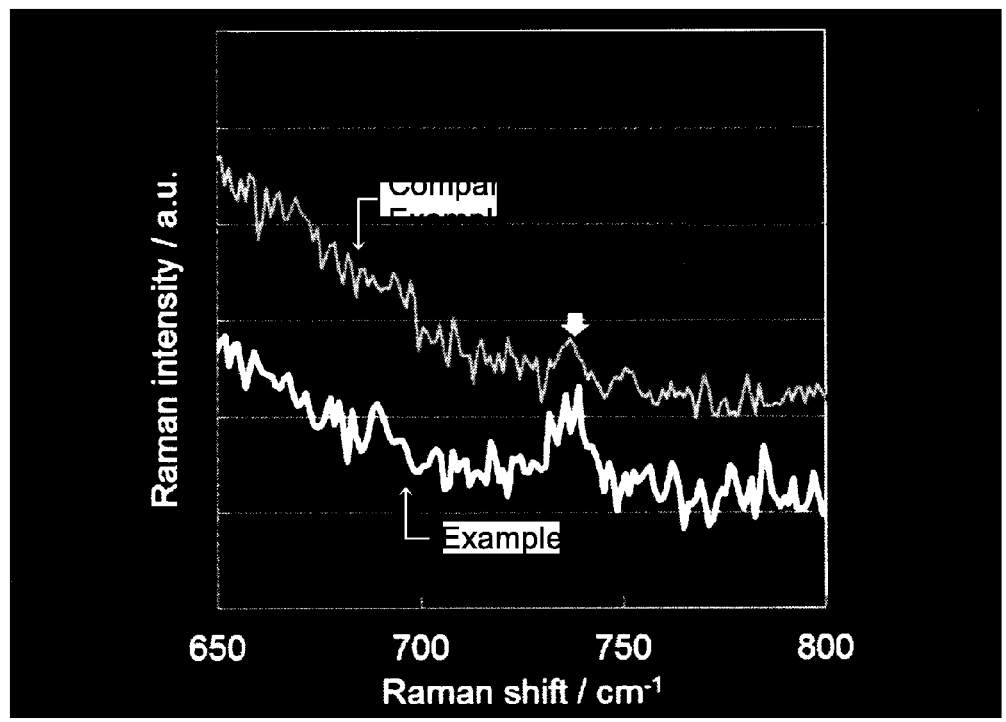
FIG. 2 is Raman spectra of lithium-ion batteries of Example 1 and Comparative Example 1.

Each of the lithium-ion batteries prepared as described above was unsealed in a dry atmosphere, and the positive electrode was taken out. The positive electrode was washed with DMC and dried, and was analyzed by Raman spectra. FIG. 2 illustrates Raman spectra obtained in Example 1 and Comparative Example 1. A peak derived from stretching mode of peroxide ion was observed at 737 $cm^{-1}$ in the Raman spectrum obtained in Example 1, while no clear peak was observed in the Raman spectrum of Comparative Example 1. In the present invention, the presence or absence of peroxide ion was determined from the presence or absence of this peak.

In addition, another lithium-ion battery prepared as described above was charged to 4.8 V at a constant current of 40 mA/g, and then further charged at a constant voltage of 4.8 V until the current was lowered to 5 mA/g, and then the battery was discharged to 2.0 V at a current of 5 mA/g in a thermostatic chamber at a temperature of 30° C., to determine an initial capacity. Using the lithium-ion battery after the determination of the initial capacity, a charge/discharge cycle, in which the battery was charged to 4.8 V at a constant current of 40 mA/g, and then further charged at a constant voltage of 4.8 V until the current was lowered to 5 mA/g, and then the battery was discharged to 2.0 V at a current of 40 mA/g, was repeated 20 times in a thermostatic chamber at a temperature of 30° C. The capacity retention after 20 cycles was determined from the ratio of the capacity determined in the first cycle to the discharge capacity determined in the 20th cycle.

<Results of Evaluations of Lithium-Ion Batteries>

The positive electrode active material used, the presence or absence of peroxide ion determined by the Raman spectrum, the initial capacity and the capacity retention after 20 cycles determined by the evaluation, and the oxidation treatment method of Examples and Comparative Examples are shown in Table 1.

As can be seen from the comparison between Example 1 and Comparative Example 1, a high capacity may be stably provided by performing the oxidation treatment to generate peroxide ion(s).

As can be seen from the comparison between Example 2 and Comparative Example 2, the effect of the present invention may be achieved not only when $Li_{1.19}Mn_{0.52}Fe_{0.22}O_{1.98}$ is used as the positive electrode active material but also when $Li_{1.21}Mn_{0.46}Fe_{0.15}Ni_{0.15}O_{1.99}$ is used. Similarly, as can be seen from the comparison between Example 3 and Comparative Example 3, the effect of the present invention may be also achieved when $Li_{1.19}Mn_{0.37}Ti_{0.15}Fe_{0.21}O_{1.97}$ is used as the positive electrode active material.

widely utilized as a secondary battery for an electronic device and an electric vehicle, and for household or facility power storage, and the like.

REFERENCE SIGNS LIST 1 positive electrode
1A positive electrode collector
1B positive electrode tab
2 negative electrode
2A negative electrode collector
2B negative electrode tab
3 separator
4 outer package

The invention claimed is:

1. A lithium-ion battery comprising
a positive electrode containing, as a principal component, a lithium oxide having a layered rock-salt structure and represented by chemical formula: $Li_xM^1_yM^2_zO_{2-d}$, wherein $1.16 \leq x \leq 1.32$, $0.33 \leq y \leq 0.63$, $0.06 \leq z \leq 0.50$, $M^1$ represents a metal ion selected from Mn, Ti and Zr, or a mixture thereof, and $M^2$ represents a metal ion selected from Fe, Co, Ni and Mn, or a mixture thereof; and
a negative electrode containing, as a principal component, a material capable of intercalating/deintercalating lithium ions, wherein peroxide ion(s) $(O_2^{2-})$ are contained in the positive electrode.

2. The lithium-ion battery according to claim 1, wherein the $M^1$ represents Mn or a mixture of Mn and Ti, and the $M^2$ represents Fe or a mixture of Fe and Ni.

3. The lithium-ion battery according to claim 1 or 2, wherein the positive electrode has been subjected to an oxidation treatment, and peroxide ion(s) $(O_2^{2-})$ are contained in the positive electrode after the oxidation treatment.

4. The lithium-ion battery according to claim 3, wherein the oxidation treatment is performed by performing charge/discharge at a temperature of 10° C. or less, and then performing charge/discharge at an elevated temperature.

5. The lithium-ion battery according to claim 4, wherein an upper limit to the voltage of the positive electrode during charge is fixed at 4.6 V or more relative to lithium metal in the oxidation treatment.

TABLE 1

| | Positive electrode active material (before oxidation treatment) | Peroxide ion | Initial capacity | Capacity retention | Oxidation treatment method |
|---|---|---|---|---|---|
| Example 1 | $Li_{1.19}Mn_{0.52}Fe_{0.22}O_{1.98}$ | present | 223 mAh/g | 61% | A prescribed charge/discharge cycle is repeated twice at 0° C., twice at 10° C., twice at 20° C., and twice at 30° C. |
| Example 2 | $Li_{1.21}Mn_{0.46}Fe_{0.15}Ni_{0.15}O_{1.99}$ | present | 245 mAh/g | 73% | A prescribed charge/discharge cycle is repeated twice at 0° C., twice at 10° C., twice at 20° C., and twice at 30° C. |
| Example 3 | $Li_{1.19}Mn_{0.37}Ti_{0.15}Fe_{0.21}O_{1.97}$ | present | 211 mAh/g | 64% | A prescribed charge/discharge cycle is repeated twice at 0° C., twice at 10° C., twice at 20° C., and twice at 30° C. |
| Comparative Example 1 | $Li_{1.19}Mn_{0.52}Fe_{0.22}O_{1.98}$ | absent | 144 mAh/g | 28% | A prescribed charge/discharge cycle is repeated four times at 30° C. |
| Comparative Example 2 | $Li_{1.21}Mn_{0.46}Fe_{0.15}Ni_{0.15}O_{1.99}$ | absent | 203 mAh/g | 56% | A prescribed charge/discharge cycle is repeated four times at 30° C. |
| Comparative Example 3 | $Li_{1.19}Mn_{0.37}Ti_{0.15}Fe_{0.21}O_{1.97}$ | absent | 186 mAh/g | 58% | A prescribed charge/discharge cycle is repeated four times at 30° C. |

INDUSTRIAL APPLICABILITY

The lithium-ion battery of the present invention may stably provide a high capacity, and therefore it may be 6. The lithium-ion battery according to claim 1, wherein the negative electrode contains graphite as the principal component.

7. A method for producing a lithium-ion battery according to claim 1, comprising a step of:

generating peroxide ion(s) ($O_2^{2-}$) in the positive electrode by an oxidation treatment in which a charge/discharge is performed at a temperature of 10° C. or less, and then a charge/discharge is performed at an elevated temperature.

8. The method for producing a lithium-ion battery according to claim 7, wherein an upper limit to the voltage of the positive electrode during charge is fixed at 4.6 V or more relative to lithium metal in the oxidation treatment.

* * * * *